April 24, 1951 A. E. FROST 2,549,796

TELEGRAPH CODE TRANSLATOR SYSTEM

Filed Oct. 29, 1949 5 Sheets-Sheet 1

INVENTOR.
A. E. FROST

BY W. F. Presson

ATTORNEY

April 24, 1951 A. E. FROST 2,549,796

TELEGRAPH CODE TRANSLATOR SYSTEM

Filed Oct. 29, 1949 5 Sheets-Sheet 2

*INVENTOR.*
A. E. FROST

*BY*

V. H. Presson

ATTORNEY

TELEGRAPH CODE TRANSLATOR SYSTEM

Filed Oct. 29, 1949 5 Sheets-Sheet 3

INVENTOR.
A. E. FROST

BY V. A. Presson

ATTORNEY

INVENTOR.
A. E. FROST
BY
[signature]
ATTORNEY

FIG. 7
| CHARACTERS PAGE UC | PAGE LC | TAPE UC | TAPE LC | CODE SIGNALS 1 | 2 | 3 | 4 | 5 |
|---|---|---|---|---|---|---|---|---|
| | | - | A | X | X | | | |
| | | ? | B | X | | | X | X |
| | | : | C | | X | X | X | |
| | | $ | D | X | | | X | |
| | | 3 | E | X | | | | |
| | | | F | X | | X | X | |
| | | & | G | | X | | X | X |
| # | | £ | H | | | X | | X |
| | | 8 | I | | X | X | | |
| | | BELL | J | X | X | | X | |
| | | ( | K | X | X | X | X | |
| | | ) | L | | X | | | X |
| . | | % | M | | | X | X | X |
| , | | ' | N | | | X | X | |
| | | 9 | O | | | | X | X |
| | | 0 | P | | X | X | | X |
| | | 1 | Q | X | X | X | | X |
| | | 4 | R | | X | | X | |
| ' | | ¶ | S | X | | X | | |
| | | 5 | T | | | | | X |
| | | 7 | U | X | X | X | | |
| | | ; | V | | X | X | X | X |
| | | 2 | W | X | X | | | X |
| | | / | X | X | | X | X | X |
| | | 6 | Y | X | | X | | X |
| | | " | Z | X | | | | X |
| | | SPACE | | | | X | | |
| CARRET | | , | . | | | | X | |
| LINE FEED | | # | = | | X | | | |
| | | FIGURES | | X | X | | X | X |
| | | LETTERS | | X | X | X | X | X |
| | | BLANK | | | | | | |
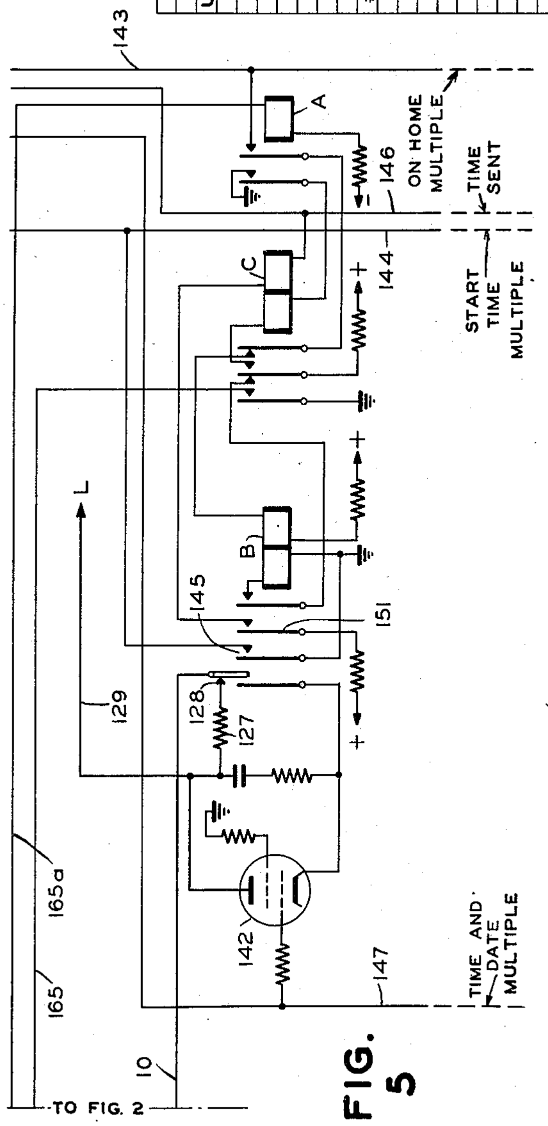
FIG. 5
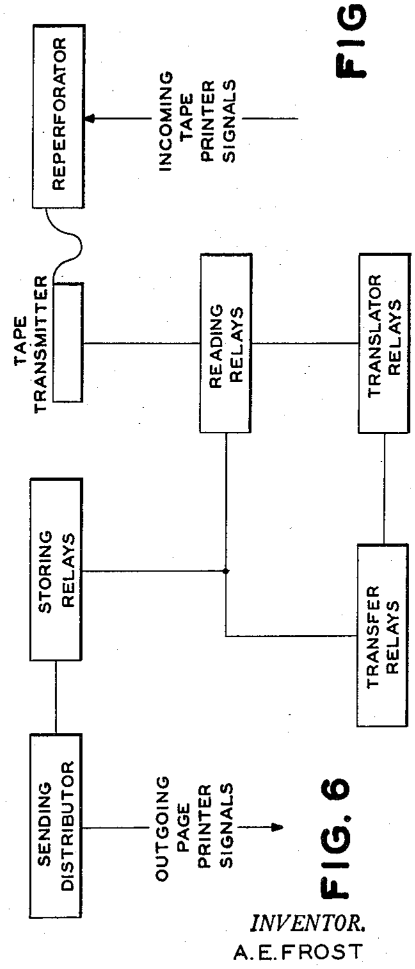
FIG. 6
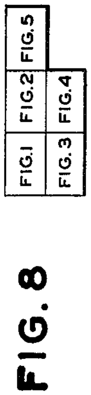
FIG. 8
INVENTOR.
A. E. FROST
BY
V. F. Presson
ATTORNEY Patented Apr. 24, 1951

2,549,796

UNITED STATES PATENT OFFICE 2,549,796

TELEGRAPH CODE TRANSLATOR SYSTEM

Albert E. Frost, Bloomfield, N. J., assignor to The Western Union Telegraph Company, New York, N. Y., a corporation of New York Application October 29, 1949, Serial No. 124,381

15 Claims. (Cl. 178—26)

This invention relates to a telegraph code translator system which is especially adapted for use with automatic printing telegraph systems, and more particularly to a system for automatically translating tape printer permutation code signals into page printer permutation code signals and inserting, where necessary, additional permutation code signals for effecting certain page printer operations.

Telegraph communication systems within the past few years have been extended to utilize reperforator switching methods for the direct delivery of telegrams to customers who have telegraph printers in their offices, such customers commonly being referred to as tie-line patrons. Some of these customers have tape telegraph printers in their offices while others prefer page machines. All business allowed to enter the reperforator switching systems is in the form of tape printer copy suitable for reproduction on tape printers. Messages originating on page machines must be manually retransmitted as tape copy for routing through the switching systems. Page printers require that "carriage return" and "line feed" functions be transmitted at various times, and there are many other differences between tape and page printer operation. To avoid manual retransmission to page tie-lines, these differences must be reconciled automatically and this is effected by a tape-to-page translator such as disclosed herein.

Telegraph code converters for translating certain tape printer characters into page printer characters and for inserting additional page printer functions have heretofore been devised, such as the converter disclosed in Connery and Coe Patent No. 2,379,865, issued July 10, 1945, and the instant invention represents certain improvements thereon which, among other features, enable a converter to perform certain special functions desirable or necessary in connection with page machines in customers' offices.

Among the objects of the invention are: to provide an efficient tape-to-page translator in which additional code conversions are obtainable; to provide a translating system which is accurately timed and controlled from the transmitting distributor employed; to enable code conversions to be immediately available by the operation of transfer relays, and without waiting for a rotary switch or similar apparatus to step around in order to effect the desired conversions; to enable a simple and inexpensive character counter to be employed instead of requiring a comparatively expensive monitor page printer for counting the number of characters (including letter spaces) in each line of page printer copy to be retransmitted; to automatically cause a time and date transmitter to transmit time and date signals at the end of each message; to automatically insert a "carriage return" and a plurality of "line feed" signals upon termination of the time and date transmission, thereby to provide suitable separation between successive messages; to cause a "carriage return" and a plurality of "letter space" signals to be transmitted whenever a paragraph sign occurs in the tape printer signals; and to provide a tape-to-page translator which is more reliable in operation and which requires less maintenance to insure satisfactory operation in commercial use.

Various other objects, advantages and improvements will be apparent from the following detailed description of an illustrative embodiment of the invention, taken in connection with the accompanying drawings, in which:

Fig. 5 shows a portion of a time and date transmitting circuit which is employed in conjunction with the translator circuit;

Fig. 6 shows a block diagram of the translator components and illustrates the plan chosen to effect translation;

Fig. 7 is a chart showing tape and page printer character assignments to illustrate the differences between them; and Fig. 8 is a diagram showing the arrangement of the various sheets of circuit drawings.

Figure 1:
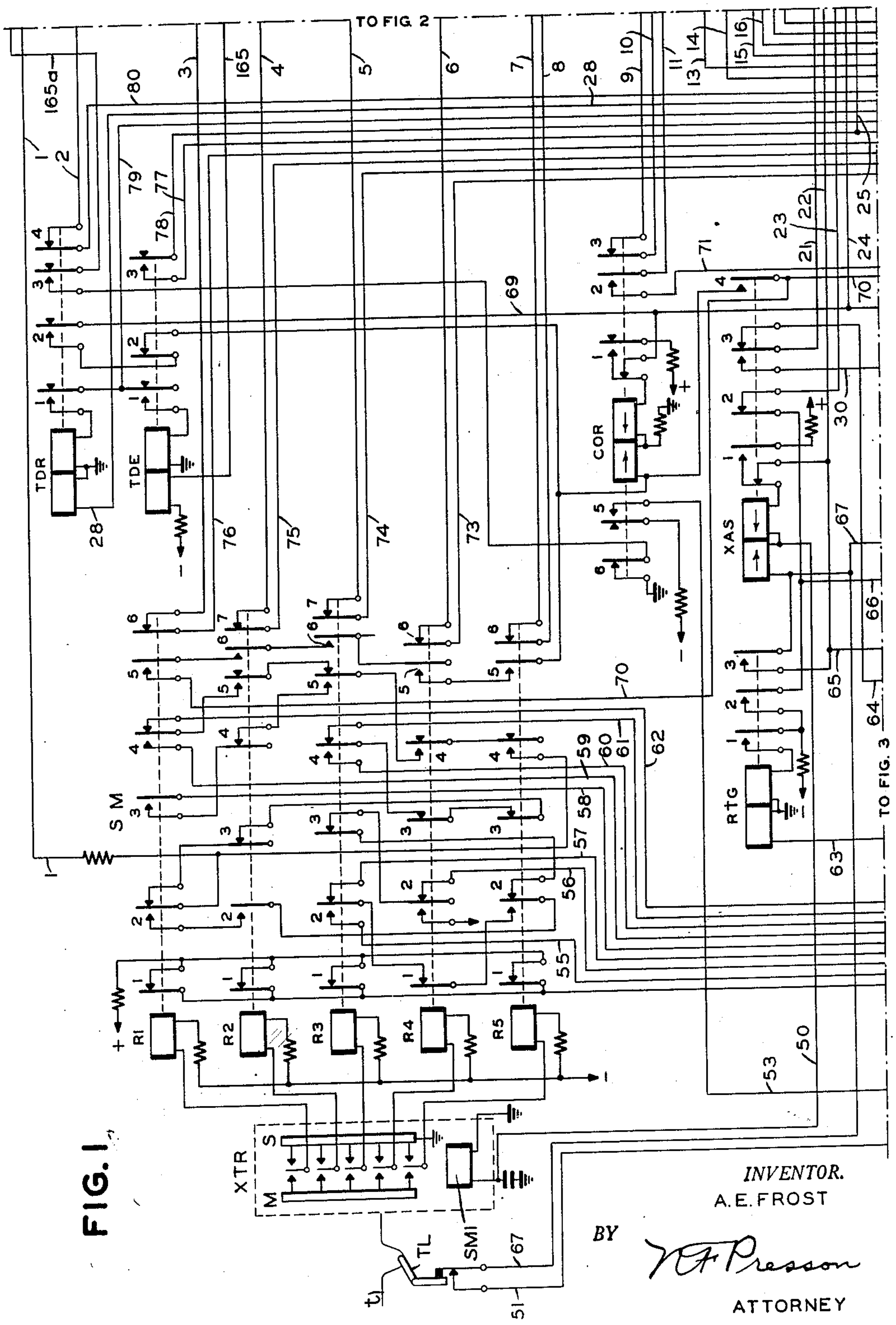
Figs. 1 to 4 are circuit drawings illustrating a five-unit code translator system in accordance with the present invention.

Referring for the moment to Fig. 7, the chart shows tape and page telegraph printer character assignments, in which only the differences between them are shown in the "page" columns. The abbreviations UC and LC refer to upper case and lower case, respectively. The marking and spacing elements of each permutation code signal are shown in the fifth column under the heading "code signals," the marking elements being indicated by crosses and the spacing elements being indicated by blank spaces. The page printer has two of the thirty-two possible combinations of the five-unit code assigned to carriage return and line feed functions; the tape printer has four characters assigned to these code combinations, which means that the tape printer has four character assignments that do not appear on the page printer. The omitted characters are: paragraph sign, equals sign, English pound sign, and the percent sign. The paragraph sign obviously is not required to be printed in page printer operation and neither is the equals sign since it is used only as an indication to the tape printer gumming operator that a new line should be started. The English pound and the percent must be written out in letters in page printer operation. The translator inserts carriage return and line feed signals at the proper places, and performs conversions for the number sign, period, comma, apostrophe, percent sign, and paragraph sign. Also, at the end of a message, in response to the end-of-message signal (a double period) it transmits carriage return and line feed; initiates a request for time and date printing signals which are inserted by a special transmitting circuit hereinafter referred to; and upon completion of the transmission of the time and date, ends the message by transmitting a carriage return and eight line feeds to provide well-defined separation between successive messages.

*General description*

Fig. 6 shows a block diagram of the translator components and shows one illustrative plan for effecting translation. Tape telegraph printer signals are received and perforated by the reperforator. The perforated tape passes through the tape transmitter which sets up the code combinations punched in the tape, character by character, on five reading relays. The reading relays carry several sets of contacts for reading the character and an additional set of transmitting contacts from which the selection may be transferred to the storing relays, should no translation be required. Associated with the storing relays is a rotary sending distributor for transmitting the signals to a page printer circuit.

Should a character requiring translation be set up on the reading relays, a circuit is established to energize one of the translator relays. One translator relay is required for each of the various functions and, when operated, it sets up the conditions required for the particular translation. Since most of the conversions require that more characters be transmitted than are received, it is necessary to establish a condition whereby a succession of conversion characters may be transferred, one at a time, to the storing relays, this being effected by transfer relays. Operation of a translator relay immediately causes the operation of an appropriate transfer relay which carries contacts for the transfer of the first conversion character to the storing relays. Provision is made that this transfer shall take place from transfer relays and not from the reading relays; that is, the first conversion character is transferred to the storing relays in place of the character requiring translation. Then a second transfer relay is operated and the first one released to effect the transfer of the second character to the storing relays. This process is repeated as many times as is required. The operation of the last transfer relay establishes circuits for the restoration of normal transmission.

It is fundamental that transmission to the translator must be stopped during the transmission of additional conversion characters. The perforated tape between the reperforator and tape transmitter furnishes the necessary loose coupling between the originating transmission and the translator. The tape transmitter is stopped and started by the translator as required.

The translator is provided with two devices not shown in the block diagram; one is a counter, hereinafter referred to, to count the number of characters in each line of page copy thereby to indicate when a carriage return and line feed should be inserted upon the reception of the following word space; the other device is a rotary switch, hereinafter described, which is used to effect the transfer of conversion characters for the paragraph sign, and also to insert the carriage return and eight line feeds at the end of a message.

Figure 2:
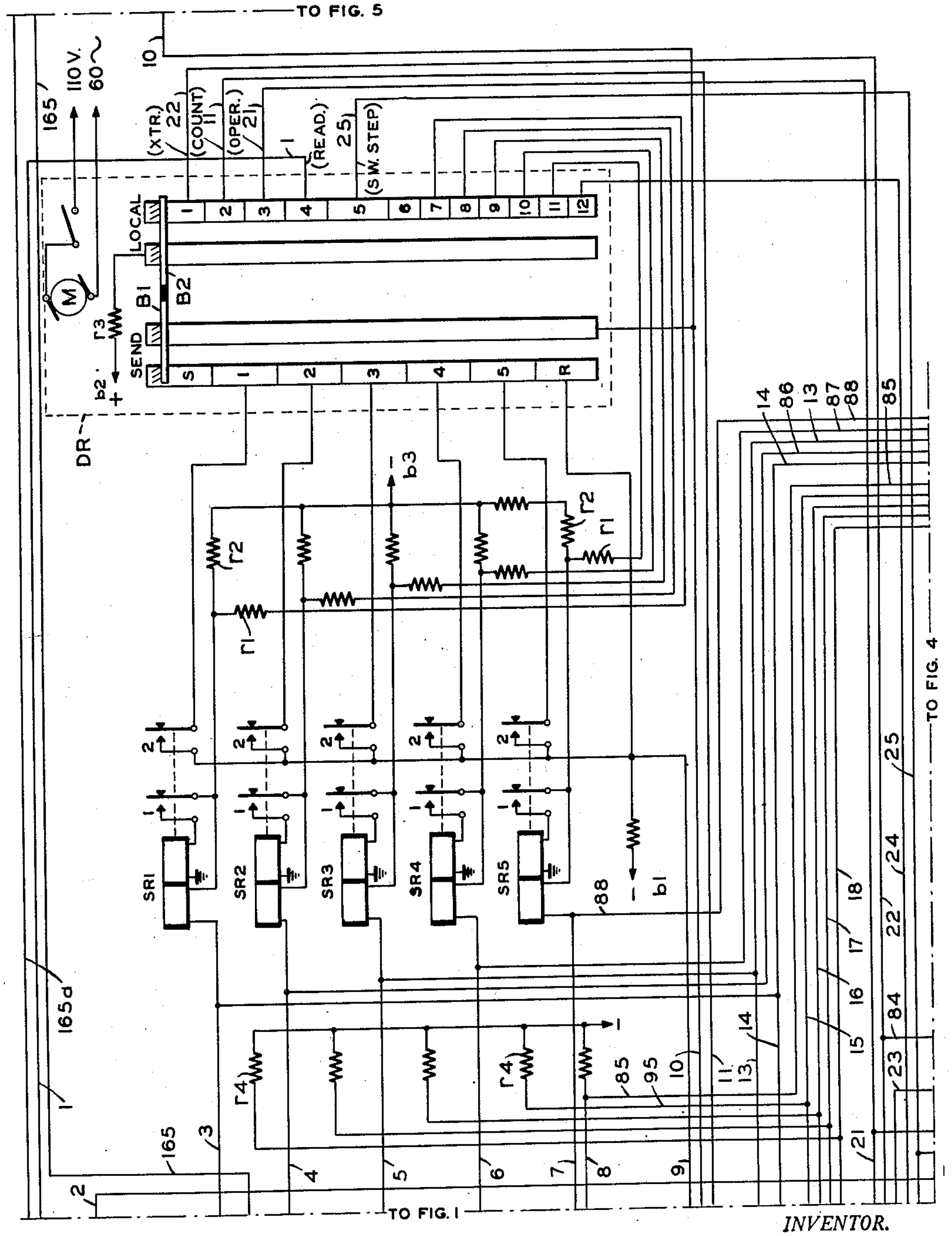

All of the events required by transmission are timed from local rings on the rotary sending distributor DR shown in the right hand portion of Fig. 2. The distributor brushes B1, B2 are continuouslly rotating, except of course that they may be stopped at the end of a business day and started at the beginning of the succeeding business day, in known manner. The "local" segments of the distributor rings are shown in proper time relation to the sending segments of the "send" rings. Stepping of the tape transmitter XTR, Fig. 1, takes place by means of a pulse received from segment 1 of the local rings, during the transmission of the start impulse from segment S of the "send" rings. It will be understood that the following five segments 1 to 5 of the sending rings of the distributor are for the purpose of sending the five marking and spacing code pulses of each permutation code signal, and that the following segment R transmits the rest or stop pulse to the receiving page printer; the marking pulses and the rest pulse are derived from negative battery *b1*, while the spacing pulses and the start pulse are represented by no-current intervals. An auto-stop relay XAS, Fig. 1, which is differentially wound as indicated by the arrows, is included in the stepping circuit of the tape transmitter XTR to stop the transmitter and hold its contacts to spacing when the auto-stop circuit is opened due to tight tape between the reperforator and the tape transmitter or because additional characters need to be inserted for a translation.

Figure 3:
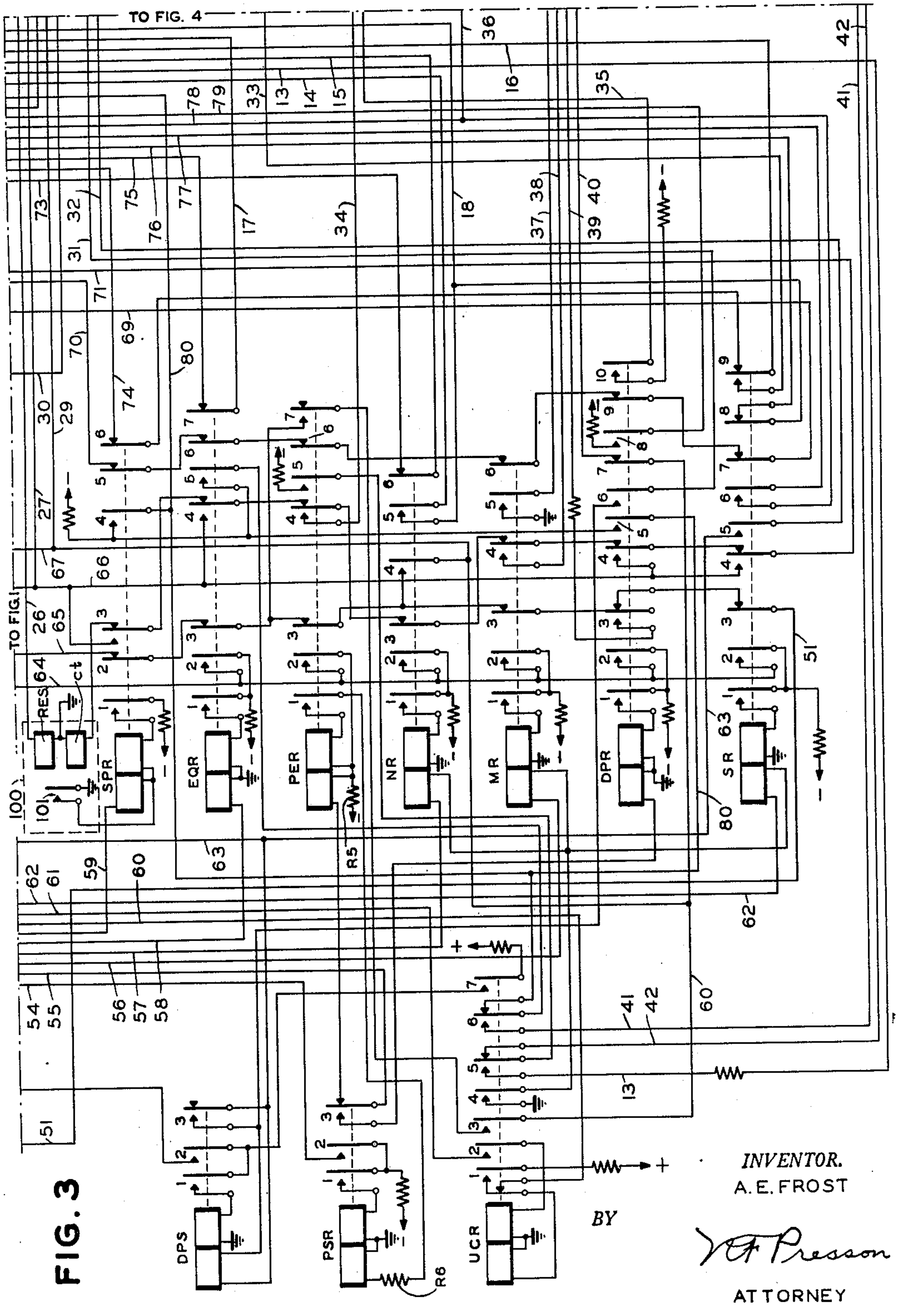

The count pulse from segment 2 of the local rings of the transmitting distributor DR steps the character counter 100, Fig. 3, resets the counter and also releases certain transfer relays in the translator circuit. The following segment 3 of the local rings is used to operate and release relays. The third pulse, from segment 4 of the local rings, seeks a path through contacts of the reading relays R1 to R5, Fig. 1, to operate translator relays shown in Figs. 3 and 4. The switch step segment 5 of the local ring of the distributor steps a rotary switch RS, Fig. 4, for the conversion of the paragraph sign and for the message ending characters. Timing of the transfer of the five code elements of a character to the five storing relays SR1 to SR5, respectively, Fig. 2, is effected by five transfer segments 7, 8, 9, 10 and 11, of the local rings of the distributor DR.

Because of the number of conversions required in translation, the transfer of the desired selection to the storing relays SR1 to SR5 is kept as simple as possible. The storing relays must be capable of responding to any one of thirteen transfer relays SPR to HT, Figs. 3 and 4, and to sixteen possible positions of the rotary switch RS, Fig. 4, in addition to the reading relays R1 to R5, Fig. 1. The circuit is arranged so that a closed circuit to battery from any of the transfer points will prepare for the transfer of a marking signal to a storing relay SR1 to SR5, and an open circuit at all of the transfer points will effect the transfer of a spacing signal. This allows all of the transfer points to be paralleled. It is merely necessary, at the time of transfer, to insure that only the desired circuits are closed.

The operating circuit for each storing relay, for example, the fifth pulse storing relay SR5, Fig. 2, is arranged so that when any one of the fifth pulse transfer points is closed, the relay is energized as the local brush B2 of the distributor DR passes over its associated transfer segment, which in this case would be segment 11 of the local rings. The relay locks up to negative battery *b3*, and during the following revolution of the distributor a marking fifth pulse signal is transmitted from segment 5 of the sending rings to the outgoing page printer line 10. Should the next fifth pulse signal be spacing, all of the transfer points would be open as the brush B2 passes over the transfer segment 11 in this revolution. Positive battery *b2*, through the transfer segment, is then applied to the locking circuit in opposition to the negative locking battery *b3*, and the relay SR5 releases. On the following revolution of the distributor DR a spacing signal is transmitted to the line 10. The location of the transfer segments 7 to 11 of the local rings is such that a storing relay SR1 to SR5 will not be disturbed during transmission from its contacts.

Since the distributor brushes B1 and B2 are continuously rotating, it is desirable to short out the distributor when no intelligence is being transmitted. This, and to prevent the counter 100 of Fig. 3 from stepping on blank characters, are two of the reasons for providing a cut-off relay COR shown in Fig. 1. The cut-off pulse from the last segment 12 of the local rings of distributor DR occurs during the transmission of the rest pulse, thereby to avoid mutilating a character. "Blank" reading contacts in relays R1 to R5 determine the position of the cut-off relays.

*Detailed circuit description*

In Figs. 1 to 5 of the drawings, the various conductors which extend horizontally between Figs. 1, 2 and 5, and Figs. 3 and 4, are designated by reference numerals 1 to 42, and conductors which extend vertically between Figs. 1 and 3, and Figs. 2 and 4, are designated by reference numerals 51 to 88, except that where horizontal conductors also extend vertically between the figures, the reference numerals assigned to the horizontal conductors generally are retained.

*Storing relay circuits*

The reading relays R1 to R5, Fig. 1, responding to the character in the tape transmitter XTR are operated when the transmitter tongues are on spacing and are released for marking. The marking and spacing positions of the tape transmitter are indicated at M and S, respectively. The five code elements of the character set up on the reading relays are transferred successively to the storing relays SR1 to SR5, Fig. 2, through the transfer segments 7 to 11 on the local rings of the distributor DR. Transmitting contacts 2 on the storing relays SR1—SR5 are connected to the transmitting segments 1 to 5 of the sending rings of the distributor in the customary manner for the transmission of "make-break" telegraph printer signals. Every character must first be read to determine whether or not it requires translation before permitting it to be transmitted. This determination is made and, if required, the conversion character is set up during the transmission of the previous character.

The outer row of contacts of the reading relays R1—R5, which are contacts 6 of relays R1, R4 and R5 and contacts 7 of relays R2 and R3, are sending contacts. A marking pulse is transferred to a storing relay when the sending contacts of its corresponding reading relay are closed, i. e., the relay is unoperated, and a circuit through one of the conductors 3 to 7 is established through the left-hand operate winding of the storing relay and its transfer segment 7 to 11 of the local rings of distributor DR to operate the storing relay. The storing relay, for example, relay SR1 locks through its right-hand winding, but no appreciable locking current flows until the local brush B2 has passed off its associated transfer segment 7. The potential at the junction of resistance *r1* and the resistance *r2* is substantially zero, or ground, as long as the brush is on the transfer segment 7 and the sending contacts 6 of the corresponding reading relay R1 are closed. In the circuit illustrated, the value of resistance *r1* is 1,350 ohms and the value of resistance *r2* is 4,000 ohms, although such values may be varied depending upon the constants of the various elements in the particular system employed.

After the brush B2 leaves the transfer segment 7, a double lock is imposed on the storing relay SR1 so long as the sending contacts 6 of the reading relay R1 remain closed. When a subsequent operation of the tape transmitter to spacing occurs and the sending contacts 6 of the reading relay open, the storing relay SR1 remains locked through its right-hand winding and the resistance *r2* to negative battery *b3*, until the local brush B2 again passes over its transfer segment 7, applying positive battery *b2* through resistance *r3* and resistance *r1* to the right-hand locking winding to ground. When the resistance *r1* has a value of 1,350 ohms, as above stated, the resistance *r3* has a value of 150 ohms, so that the positive battery is applied through 1,500 ohms to the locking winding of the storage relay. This tends to reverse the locking current and the storing relay releases to spacing position, that is, its contacts are in their unoperated position. The storing relays for the spacing pulses are not changed when the local brush B2 passes over the transfer segments and remain unoperated.

The five pulses, comprising a character, are transferred to their associated storing relays after the transmission of each particular pulse of the preceding character has been completed. This requirement locates the fifth transfer, from segment 11 of the local ring, during the transmission of the rest pulse from segment R of the sending ring of the distributor.

*Auto-stop circuit*

The transmitter step pulse from segment 1 of the local rings of DR occurs during the start pulse. The auto-stop circuit includes an auto-stop relay XAS, Fig. 1, and the tape lever TL which is controlled by the loop in the perforated tape *t* which issues from the reperforator and passes to the tape transmitter. This circuit is the conventional auto-stop and a detailed description of its operation need not be given. The action of the XAS relay, however, is quite important since most of the conversions require more characters to be transmitted than are received. For example, three characters must be transmitted for a "period" and this requires the tape transmitter to be auto-stopped for two characters, this being accomplished by opening the circuit in series with the auto-stop lever TL.

The following transmitter step pulse from segment 1 of the local rings of the distributor DR operates the relay XAS and energizes the transmitter step magnet SM1 over a circuit comprising conductor 22, make-before-break contacts 1 of relay XAS, right hand winding of the relay, conductor 50, and the transmitter step magnet SM1 to ground. Relay XAS energizes and locks to positive battery over its operated contacts 1, and the tape transmitter remains on spacing until the circuit is subsequently closed and relay XAS is released by the following transmitter pulse received over conductor 22 from segment 1 of the local rings of the distributor, allowing the next tape character in the transmitter to be read. The release of relay XAS is effected by positive battery from b2 which is applied to conductor 22 and the auto-stop circuit which comprises conductor 65, unoperated contacts 2 of relay SPR, Fig. 3, unoperated contacts 3 of relays EQR, PER, MR, DPR and SR, conductor 51, through the closed contacts of tape lever TL, Fig. 1, conductor 67, left-hand winding of relay XAS, conductor 50 and transmitter magnet SM1 to ground. Since XAS is a differential relay, positive current flowing through its left-hand winding neutralizes the effect of the positive locking current in its right-hand winding and the relay releases.

*Cut-off circuit*

The cut-off relay COR, Fig. 1, is in circuit with conductor 24 connected to local segment 12 of the distributor DR, and also is in circuit with the "blank" reading contacts of the reading relays R1 to R5, which are contacts 5 of relays R1, R4 and R5, and contacts 6 of relays R2 and R3. Relay COR is differential and responds in a manner similar to relay XAS. When released, unoperated contacts 3 of relay COR close the outgoing line 10 to prevent the transmission of "blanks" when blank tape is being stepped through the tape transmitter XTR or when the transmitter is normally auto-stopped. Blank tape causes the five code elements all to be spacing in character and thus all five of the reading relays R1 to R5 are operated at such time. The outgoing line 10, however, is not closed by relay COR when the transmitter is auto-stopped to permit transmission of conversion characters. Relay COR is operated or released only during the transmission of a rest pulse by distributor DR to insure non-interference with the transmission of a character by the distributor.

When the blank reading circuit is closed, relay COR is released, the release circuit comprising segment 12 of distributor DR, conductors 24 and 69, Figs. 2, 1 and 3, unoperated contacts 7 of relay SR, Fig. 3, unoperated contacts 9 of relay DPR, unoperated contacts 6 of relays MR, PER and EQR, unoperated contacts 5 of relay SPR, conductor 70, operated contacts 5 of reading relay R1, Fig. 1, operated contacts 6 of relays R2 and R3, operated contacts 5 of relays R4 and R5, and through the left-hand winding of relay COR to ground. Since the positive battery applied through the left-hand winding of the differential relay neutralizes the effect of the positive locking battery through the right-hand winding and operated contacts 1 of the relay, the relay releases. When the blank reading circuit is open, indicative of a character to be transmitted, relay COR will be operated when the distributor brush B2 passes over the next COR segment 12 of the local ring of distributor DR, and will remain locked, through its operated contacts 1, until the blank reading circuit is again closed provided that its closure occurs prior to the operation of a time and date request relay TDR hereinafter described.

*End of line*

The translator circuit automatically inserts a carriage return and a line feed at the end of a line of the copy transmitted over the page printer circuit. The counter 100, Fig. 3, is stepped by the count pulse from segment 2 of the local rings of distributor DR for each character transmitted. The count pulse is routed through contacts 2 of the relay COR, Fig. 1, which is operated when normal characters are being transmitted, the circuit comprising said segment 2 of DR, conductor 11, contacts 2 of COR conductor 71, Figs. 1 and 3, unoperatde contacts 4 of relays SR, DPR and MR, Fig. 3, unoperated contacts 3 of relay NR, unoperated contacts 4 of relays PER and EQR, and unoperated contacts 3 of the word-space relay SPR to the count magnet Ct of the counter to ground. After the fifty-third character, the contacts 101 of the counter close, connecting ground to the left-hand winding of the word-space relay SPR. When a "space" (3 marking; 1, 2, 4, 5 spacing) following the next word is stepped into the transmitter XTR, reading relays R1, R2, R4 and R5 are operated, and relay SPR is operated by the read pulse from segment 4 of the local rings of distributor DR through a circuit comprising conductor 1, Figs. 2 and 1, operated contacts 4 of reading relays R5 and R4, Fig. 1, unoperated contacts 5 of relay R3, operated contacts 5 of relay R2, operated contacts 4 of relay R1, conductor 59 and the left-hand winding of relay SPR to the ground on operated contacts 101 of the counter.

Relay SPR locks up from negative battery on its operated contacts 1, and the right-hand winding of the relay to ground through the operated contacts 101 of the counter. The operation of relay SPR at its contacts 2 opens the auto-stop circuit comprising conductors 51, 65 and 67, and opens at its operated contacts 6 the operating transfer circuit 74 for the third reading relay R3. At its operated contacts 4, relay SPR operates the carriage return transfer relay CRT, Fig. 4, over a circuit comprising conductor 80, Figs. 3 and 1, unoperated contacts 4 of relay TDR, Fig. 1, and conductor 2, the left-hand winding of relay CRT being connected to ground through unoperated contacts 4 of relay LFT. The operation of relay CRT at its contacts 2 causes the fourth pulse storing relay SR4 of Fig. 2 to be connected to negative battery over a circuit comprising conductors 87, 15 and 95 and resistance r4, Fig. 2. The other four storing relays are not connected, so that a carriage return (4 marking, 1, 2, 3, 5 spacing) will therefore be transferred to the storing relays to replace the deleted word space.

Figure 4:
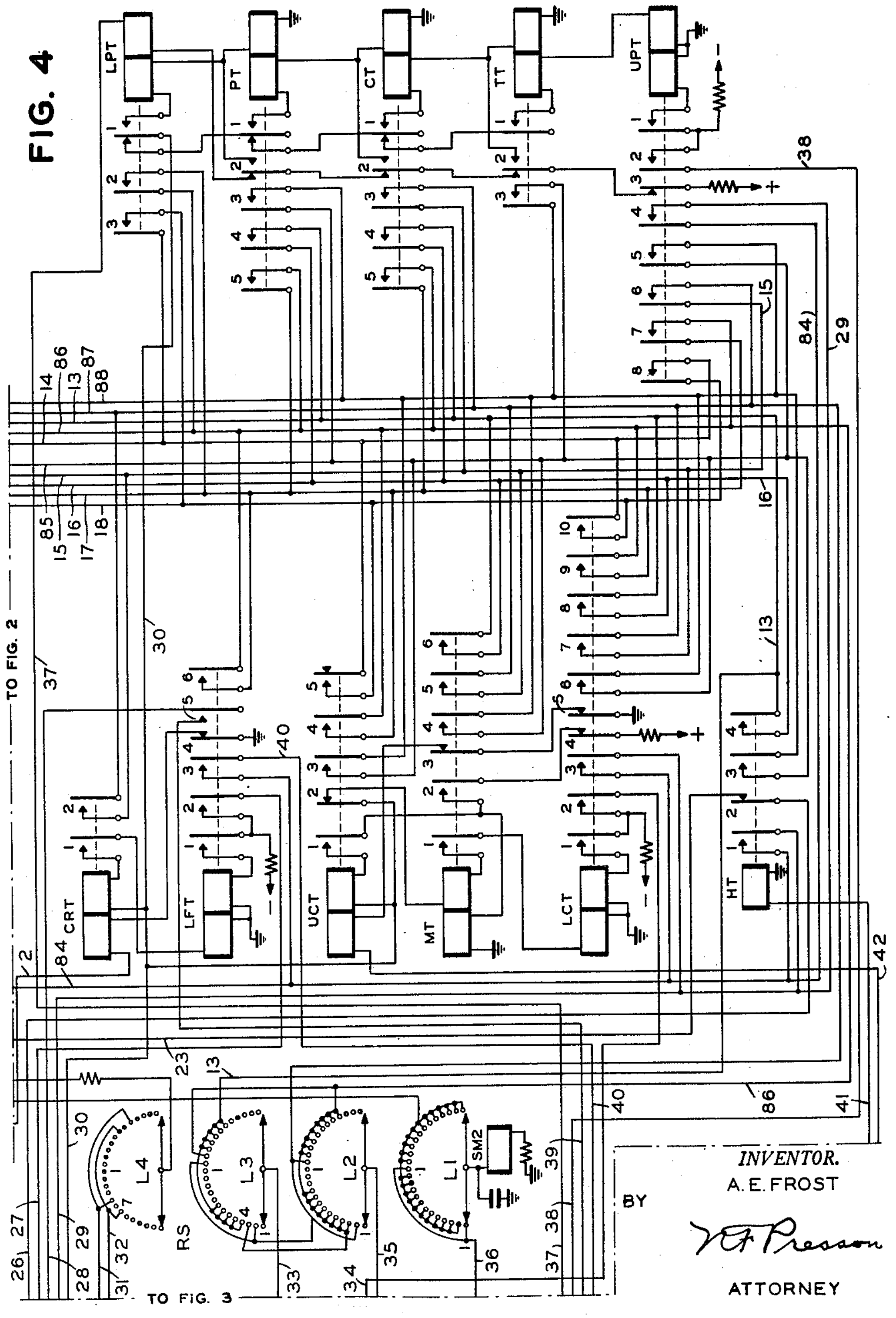

The next transmitter step pulse from local segment 1 of distributor DR over conductor 22 operates the transmitter auto-stop relay XAS and the transmitter step magnet SM, since the auto-stop circuit comprising conductors 51, 65 and 67 is open at operated contacts 2 of relay SPR, Fig. 2; the operation of the step magnet SM pulls down the tape transmitter pins so that the reading relays R1 to R5 are all operated to their spacing contacts. The line feed transfer relay LFT, Fig. 4, is energized by a pulse received from the operate segment 3 of the local rings of distributor DR over a circuit comprising conductor 21, Figs. 2 and 1, operated transfer contacts 3 of relay XAS, conductor 30, Figs. 1, 3 and 4, right-hand winding and operated contacts 1 of relay CRT, and the left-hand winding of line feed transfer relay LFT to ground. Relay LFT at its operated contacts 3 closes the auto-stop circuit through conductors 34 and 40, unoperated contacts 7 of relay DPR, Fig. 3, and conductor 67, the auto-stop circuit formerly having been opened at operated contacts 2 of relay SPR. Relay LFT locks through its right-hand winding and operated contacts 1 to negative battery, and at its operated contacts 4 releases relay CRT. The second storing relay SR2, Fig. 2, is then operated when brush B2 passes transfer segment 8 of distributor DR, to set up a line feed (2 marking; 1, 3, 4, 5 spacing), the circuit comprising conductor 86, operated contacts 6 of relay LFT, conductors 17 and 93, and resistance $r4$ to negative battery. The foregoing operations occur during the transmission of the carriage return. A line feed signal is then transmitted during the next revolution of the brush B1 of distributor DR.

On the next transmitter step pulse from segment 1 of distributor DR over conductor 22, relay XAS, Fig. 1, is released, since the auto-stop circuit was closed through contacts 3 of relay LFT, thereby causing current to flow in the left-hand winding of relay XAS in opposition to the current flowing in the right-hand winding. The tape transmitter XTR is now unlocked and steps to the next character which is set up on the reading relays R1 to R5. The next count pulse from segment 2 of distributor DR flows over a circuit comprising conductor 11, operated contacts 2 of relay COR, conductor 71, Figs. 1 and 3, through a chain circuit formed by unoperated contacts of relays SR, DPR, MR, NR, PER and EQR, operated contacts 3 of relay SPR, conductor 27, Figs. 3 and 4, through operated contacts 1 and 2 of relay LFT and the right-hand winding of the relay to ground. This flow of positive battery through the winding neutralizes the negative holding battery and causes relay LFT to release. The count pulse, at the operated contacts 3 of relay SPR, also resets the counter 100 over a circuit comprisng conductor 66, unoperated contacts 2 of relay XAS, conductor 23, Figs. 1, 2 and 4, unoperated contacts 2 of relay HT, Fig. 4, and conductor 26 through the restoring magnet RES of the counter 100 to ground. When the counter contacts 101 open, relay SPR is released, and the circuits return to normal. It should be noted that the tape transmitter is auto-stopped only for the transfer of the line feed.

The counter 100 may comprise any type suitable for the purpose, several of which are known in the art. Usually the counter comprises an actuating magnet which operates a driving pawl and ratchet to step a rotatable drum or wheel as each count pulse is received until the number of count pulses total 53, at which time a cam on the wheel or drum closes the contacts 101. The next count pulse following the transfer of the line feed character to the storing relays SR1—SR5 then operates a reset magnet, over the circuit described above, which causes withdrawal of the pawl from its ratchet, and the counter returns to its starting position under the action of a coiled spring. One type of such a counter is illustrated in Bulletins 166 and 1090 issued by the Teletype Corporation of Chicago, Illinois.

*Count circuit*

The count pulse received over conductor 11 not only steps and resets the counter but also releases certain transfer relays. For the end-of-line function, described above, the count pulse is used to release the line feed transfer relay LFT. It will be shown later how the count pulse is used to release the lower case transfer relay LCT of Fig. 4 during the conversion of the "period," and also the upper case transfer relay UPT of Fig. 4 for the percent sign.

*Equals sign*

The "equals sign" and the "number sign" are the lower case and upper case tape printer characters for the same code selection (2 marking; 1, 3, 4, 5 spacing). The "equals sign" must be converted into carriage return and line feed, and the upper case character (number sign) must be converted into upper case H for page printer operation. The method of converting the lower case character will now be described.

The circuits for the conversion of "equals sign" to carriage return and line feed signals are similar to those above described for the end-of-line function. When the code selection (2 marking; 1, 3, 4, 5 spacing) is set up on the reading relay contacts, the "equals sign" relay EQR, Fig. 3, is operated and locked when the local brush B2 of distributor DR passes over the next "read" segment 4; the circuit comprises conductor 1, operated contacts 4 of reading relays R5 and R4, operated contacts 5 of relay R3, unoperated contacts 4 of relay R2, operated contacts 3 of relay R1, conductor 58, and the left-hand winding of relay EQR to ground; the relay operates and locks from negative battery through its operated contacts 1 and its right-hand winding to ground. The operation of relay EQR at its contacts 3 opens the auto-stop circuit; at its operated contacts 7 it opens the operating transfer circuit comprising conductors 75, 17 and 93 of the second reading relay R2; and at its contacts 5 relay EQR operates the carriage return transfer relay CRT through the contacts 6 of unoperated relay UCR over a circuit comprising conductor 80, Figs. 3 and 1, unoperated contacts 4 of relay TDR, Fig. 1, conductor 2, Figs. 2, 1 and 4, left-hand winding of relay CRT, Fig. 4, and unoperated contacts 4 of relay LFT to ground. The operation of relay CRT, at its contacts 2, and a circuit comprising conductors 15, 95 and 87, causes the 4th pulse storing relay SR4 of Fig. 2 to be energized. Storing relays SR1, SR2, SR3 and SR5 are not operated and will send spacing. A carriage return has therefore been set up on the storing relays to take the place of the deleted "equals sign."

The next transmitter step pulse over conductors 22 and 50 will therefore operate relay XAS and step magnet SM1, pulling down the transmitter pins so that the reading relays R1 to R5 are operated to their spacing contacts. Relay XAS locks to positive battery over its operated contacts 1. Line feed transfer relay LFT, Fig. 4, is energized and relay CRT is released by the next operate pulse over a circuit comprising operated contacts 1 of relay CRT, right-hand winding of CRT, conductor 30, operated contacts 3 of relay XAS, and conductor 21 to segment 3 of the local rings of distributor DR. Relay LFT at its operated contacts 8 energizes the second storing relay SR2 over a circuit comprising conductors 86, 17 and 93, so that a line feed is set up on the storing relays. The next transmitter pulse received over the circuit comprising conductors 22 and 84, operated contacts 3 of relay LFT, conductor 40, unoperated contacts 7 of relay DPR, Fig. 3, and conductor 67, releases relay XAS and causes a new character to be stepped into position over the transmitter pins. The count pulse received over a circuit comprising conductor 11, operated contacts 2 of relay COR, conductor 71, the chain circuit through unoperated contacts of relays SR, DPR, MR, NR, PER, operated contacts 4 of relay EQR, conductors 66 and 27, Figs. 3 and 4, and operated contacts 1 and 2 of relay LFT, releases relay LFT, and operates the counter reset magnet RES over a circuit comprising a conductor 66, unoperated contacts 2 of relay XAS, conductor 23, unoperated contacts 2 of relay HT, Fig. 4, and conductor 26. The operate pulse received over a circuit comprising conductor 21, unoperated contacts 3 of relay XAS, conductor 64, operated contacts 1 and 2 of relay EQR, and the right-hand winding of the relay, causes EQR to release. The function has now been completed and the relays are in their normal positions.

*Number sign*

The conversion of number sign into upper case H requires the addition of an H transfer relay to those required for the equals sign conversion. Relay UCR of Fig. 3 was in its released position for the equals sign conversion, whereas this relay must be in its operated position for conversion of the number sign. When a figure shift character is stepped over the pins of the tape transmitter, reading relay R3 is operated and its contacts close a circuit permitting the next read pulse from segment 4 of the local rings of distributor DR to operate relay UCR. This circuit comprises conductor 1, unoperated contacts 2 of reading relay R1, unoperated contacts 3 of relay R2, unoperated contacts 3 of relays R5 and R4, operated contacts 4 of relay R3, conductor 60, make-before-break contacts 1 of relay UCR, and through its left-hand winding to ground. Relay UCR locks to positive battery through its operated contacts 1 and its left-hand winding to ground. The "figures" character is then transferred to the storing relays SR1 to SR5 by the transfer pulses from segments 7 to 11 of the local rings of distributor DR. The transmitter pulse from segment 1 of distributor DR then steps the next character over the pins of the tape transmitter in a manner hereinbefore described, and let us assume that this character is the number sign, which is 2 marking and 1, 3, 4 and 5 spacing. The next read pulse from segment 4 of distributor DR operates relay EQR over a circuit comprising conductor 1, operated contacts 4 of relays R5 and R4, operated contacts 5 of relay R3, unoperated contacts 4 of relay R2, operated contacts 3 of relay R1, conductor 58, and the left-hand winding of relay EQR to ground. The relay locks to negative battery through its operated contacts 1 and its right-hand winding to ground. The operated contacts 3 of relay EQR open the auto-stop circuit comprising conductors 51 and 67, and at its operated contacts 7 relay EQR opens the transfer circuit, comprising conductors 17 and 75, for the storing relay SR2. The operation of relay EQR also prepares, at its contacts 4, a circuit for later resetting the counter 100, and at its contacts 2 prepares a circuit for later causing the release of the relay EQR. At its contacts 5, relay EQR causes operation of the number sign relay HT, Fig. 4, this circuit comprising positive battery on the make contact 5 of the relay, operated contacts 6 of relay UCR, conductor 41, and winding of relay HT to ground.

The operation of relay HT at its operated contacts 1 recloses, through conductors 29 and 84, the auto-stop circuit opened by contacts 3 of operated relay EQR. At its operated contacts 2 relay HT opens the counter reset circuit comprising conductors 23 and 26 prepared by operated contacts 4 of relay EQR. Operated contacts 4 and 3 of relay HT respectively close circuits to storing relays SR3 and SR5 so that the page printer number sign character which is upper case H (3, 5 marking; 1, 2, 4 spacing) is transferred by the following transfer pulses from segments 7 to 11 of the local rings of the distributor DR and is transmitted instead of the tape printer character over the transmitter pins. The transmitter tape *t* is stepped by the next step pulse over conductors 22 and 50 to the next character. The count pulse over conductor 11 following the transmitter step pulse does not operate the counter reset magnet RES since its circuit, including conductors 23 and 26, was opened at the operated contacts 2 of relay HT.

The following operate pulse over conductors 21 and 64 and operated contacts 1 and 2 of relay EQR and the right-hand winding of the relay to ground neutralizes the negative locking battery and causes relay EQR to release. The release of EQR, at its contacts 5 releases relay HT, and restores the associated circuits to normal. Relay UCR, which was operated and locked as above described, remains locked until a following letters shift character is set up on the reading relays R1—R5, at which time the read pulse from local segment 4 of DR applies a neutralizing current through the right-hand winding of UCR and effects its release; this circuit comprises conductor 1, unoperated contacts 2 of relay R1, unoperated contacts 3 of R2, R4 and R5, and unoperated contacts 4 of R3, conductor 61, and operated contacts 2 of relay UCR. It will be noted that no extra characters were required for the above conversion and the transmitter was not auto-stopped.

*Apostrophe*

The apostrophe, which is upper case N in tape printer operation, must be converted to upper case S for page printer operation. Inasmuch as the apostrophe is an upper case character, relay UCR, Fig. 3, was operated and locked by the read pulse over conductor 1 when the preceding figures shift character (1, 2, 4, 5 marking; 3 spacing) was set up on the reading relays R1 to R5 by the tape transmitter. When "N" (3, 4 marking; 1, 2, 5 spacing) is set up on the reading relays under this condition, relay NR, Fig. 3, will be operated by the next read pulse over conductor 1, the circuit comprising operated contacts 2 of relays R1, R2 and R5, unoperated contacts 1 of relay R4, unoperated contacts 2 of relay R3, conductor 57, left-hand winding of relay NR, Fig. 3, and operated contacts 4 of relay UCR, to ground. Relay NR locks to negative battery through its operated contacts 1. Operated contacts 2 of relay NR set up its own knockdown circuit; operated contacts 3 of the relay open the counter circuit; operated contacts 4 bridge the auto-stop arm contacts by means of conductors 51 and 67 to prevent an auto-stop function while the relay is operated; operated contacts 5 set up a transfer circuit comprising conductors 14, 18 and 92 for operating storing relay SR1; and operated contacts 6 of NR open the transfer circuit comprising conductors 15, 95 and 73 for the storing relay SR4. The transfer circuit for storing relay SR3 is not subject to relay NR and is connected directly to the storing relay. The apostrophe, which is the upper case S in page printer operation (1, 3 marking; 2, 4, 5 spacing), will therefore be transferred to the storing relays by the transfer pulses from segments 7 to 11 of distributor DR.

The tape transmitter will be stepped by the next transmitter step pulse received over conductors 22 and 50. The counter 100 will not be operated by the following count pulse over conductor 11 since the circuit was opened at operated contacts 3 of relay NR. Relay NR will then be knocked down by the operate pulse over conductor 21, unoperated contacts 3 of relay XAS, and operated contacts 1 and 2 of relay NR since the positive battery which flows through the right-hand winding of the relay neutralizes the negative holding battery for the relay. The associated circuits will be restored to normal.

*Percent*

The percent sign, which is upper case M in tape printer operation, is converted into letters shift, PCT, and figures shift for page printer operation. Since the percent sign is an upper case character, relay UCR of Fig. 3 was operated and locked by the read pulse over conductor 1 when the preceding figures shift character was set up on the reading relays R1 to R5, as in the case of apostrophe translation above described. When "M" (3, 4, 5 marking, 1, 2 spacing) is set up on the reading relays under this condition, relay MR of Fig. 3 is operated and locked by the next read pulse over conductor 1, the circuit comprising operated contacts 2 of relays R1 and R2, unoperated contacts 2 of relay R5, unoperated contacts 3 of relay R3, unoperated contacts 2 of relay R4, conductor 56, left-hand winding of relay MR, and operated contacts 4 of relay UCR, to ground. Relay MR locks to negative battery on its operated contacts 1 and the right-hand winding of the relay to ground. The operated contacts 2 of relay MR set up its own knockdown circuit; operated contacts 3 of the relay open the auto-stop circuit; operated contacts 4 open the counter circuit and partially prepare, through conductor 38, a knockdown circuit for relay UPT, Fig. 4, although the latter relay is as yet unoperated. Relay MR at its operated contacts 6 also opens the knockdown circuit for relay COR; and at its operated contacts 5 causes operation of a lower case transfer relay LPT, Fig. 4, the operating circuit for LPT comprising grounded contacts 5 of relay MR, conductor 37, right-hand winding of relay LPT, and a chain circuit extending through unoperated contacts 2 of relays PT, CT and TT and unoperated contacts 3 of relay UPT to positive battery. The operated contacts 3 and 2 of relay LPT close the transfer circuits for storing relays SR1 and SR2, respectively. The transfer circuits for the storing relays SR3, SR4 and SR5 are not subject to relay LPT and go directly to their respective storing relays. The character letters shift will therefore be transferred by the following transfer pulses from local segments 7 to 11 of distributor DR.

Relay XAS will be operated and locked by the next transmitter step pulse over conductor 22. The next operate pulse from local segment 3 of DR over conductors 21 and 30 operates relay PT, Fig. 4, this circuit comprising the operated contacts 1 and left-hand winding of relay LPT and the right-hand winding of relay PT to ground. The operate pulse is positive battery and its flow through the left-hand winding of LPT aids the right-hand winding to prevent premature opening of its contacts 1 which, if it occurred, would clip the operate pulse through relay PT and prevent proper operation and locking of the latter relay. Relay PT operates and at its break contact 2 opens the locking circuit for relay LPT which releases upon termination of the operate pulse. Relay PT locks over a circuit comprising ground on its right-hand winding, operated contacts 2 of the relay, unoperated contacts 2 of relays CT and TT, and unoperated contacts 3 of relay UPT to positive battery. Contacts 5, 4 and 3 of relay PT close the transfer circuits for storing relays SR2, SR3 and SR5, respectively. Since the tape transmitter is now auto-stopped, the reading relays R1 to R5 are operated to spacing and the transfer circuits for storing relays SR1 and SR4 are open, and the character "P" will therefore be transferred by the following transfer pulses from segments 7 to 11 of the distributor.

The next operate pulse from local segment 3 of distributor DR is received over conductors 21 and 30 and operates and locks transfer relay CT and knocks down transfer relay PT, the circuit including unoperated contacts 1 of relay LPT, operated contacts 1 and left-hand winding of relay PT, and right-hand winding of relay CT to ground. The operation of relay CT and the release of relay PT are performed generally in the manner above described in connection with the operation and release, respectively, of relays PT and LPT. Relay CT locks through its operated contacts 2 and the unoperated contacts 2 and 3 of relays TT and UPT, to positive battery. The operated contacts 5, 4 and 3 of relay CT respectively close the transfer circuits for storing relays SR2, SR3 and SR4. The transfer circuits for storing relays SR1 and SR5 from the reading relays R1 and R5 are open since the latter relays are operated to their spacing contacts by the auto-stopped tape transmitter. The character "C" will then be transferred by the following transfer pulses from local segments 7 to 11 of distributor DR.

The next operate pulse from local segment 3 of distributor DR is also received over conductors 21 and 30 and operates and locks transfer relay TT and knocks down relay CT, the circuit including unoperated contacts 1 of relays LPT and PT, operated contacts 1 and left-hand winding of relay CT, and the right-hand winding of relay TT to ground. Relay TT locks over its operated contacts 2 and unoperated contacts 3 of relay UPT to positive battery. Operated contacts 3 of relay TT close the transfer circuit for storing relay SR5. Since the reading relays R1 to R5 are still operated to their spacing contacts by the auto-stopped tape transmitter, the transfer circuits for storing relays SR1, SR2, SR3 and SR4 are open. The character "T" will be transferred by the following transfer pulses from the local rings of distributor DR.

The next operate pulse from local segment 3 of the distributor is also received over conductors 21 and 30 and operates and locks transfer relay UPT and knocks down relay TT, the circuit including unoperated contacts 1 of relays LPT, PT and CT, operated contacts 1 and left-hand winding of relay TT and the right-hand winding of relay UPT to ground. Relay UPT locks through its left-hand winding and operated contacts 1 to negative battery. The operated contacts 8, 7, 6 and 5 of relay UPT respectively close the transfer circuits for storing relays SR1, SR2, SR4 and SR5, and relay UPT at its operated contacts 4 prepares a knockdown circuit for the transmitter auto-stop relay XAS. The reading relays R1 to R5 are still operated to their spacing contacts by the auto-stopped transmitter so that the transfer circuit for storing relay SR3 is open. The figures shift character will then be transferred by the following transfer pulses from segments 7 to 11 of the distributor.

The next transmitter step pulse over conductor 22 will knock down the auto-stop relay XAS and will allow the tape transmitter to step to the next character. The next count pulse from local segment 2 of the distributor will knock down relay UPT over a circuit comprising conductor 11, operated contacts 2 of relay COR, conductor 71, operated contacts 4 of relay MR, conductor 38, and operated contacts 1 and 2 and left-hand winding of relay UPT. The operate pulse immediately following, over conductor 21, unoperated contacts 3 of relay XAS, conductor 64, and operated contacts 1 and 2 and the right-hand winding of relay MR will knock down the relay and restore the circuits to normal.

*Paragraph*

The paragraph sign, which is upper case S in tape printer operation, must be converted to carriage return, line feed, and five word spaces for page printer operation. Relay UCR was operated and locked by the read pulse over conductor 1 when the preceding figures shift character was set up on the reading relays R1 to R5 by the tape transmitter. When upper case S (1, 3 marking; 2, 4, 5 spacing) is set up on the reading relays under this condition, the paragraph sign relay SR, Fig. 3, is operated and locked by the next read pulse over conductor 1, the circuit including operated contacts 4 of relays R5 and R4, unoperated contacts 5 of relay R3, operated contacts 5 of relay R2, unoperated contacts 4 of relay R1 conductor 62, left-hand winding of relay SR, and operated contacts 4 of relay UCR to ground. Relay SR locks over a circuit from ground through its right-hand winding and its operated contacts 1 to negative battery. Operated contacts 2 of relay SR set up its own knockdown circuit; operated contacts 3 of the relay open the auto-stop circuit; operated contacts 4 open the counter circuit and set up a circuit for the subsequent operation of the counter reset magnet RES. Relay SR at its operated contacts 4 also sets up a knockdown circuit for relay RTG which at this time, however, is not operated. At its operated contact 7 relay SR opens the knockdown circuit for relay COR and prepares a circuit for the later operation of relay RTG; at its operated contacts 8 and 9 it opens the transfer circuits for storing relays SR1 and SR3; at its operated contacts 6 it closes the step circuit for rotary switch RS; and at operated contacts 9 it closes a circuit to permit the rotary switch to operate storing relay SR2, SR3 or SR4 later.

The rotary switch RS of Fig. 4 has four switch banks or levels L1 to L4, and each bank comprises two sets of contact studs with the corresponding studs of the two sets connected in multiple, so that the opposite arms of the wiper of each bank successively operate to contact the studs during each complete revolution of the wiper. The step switch pulse from local segment 5 of distributor DR, over conductors 25 and 82, switch bank L1, and step magnet SM2, immediately following the above read pulse steps the wipers of the rotary switch RS from their home positions on stud #1 to stud #2 of their respective switch banks L1 to L4. The transfer relay circuit for storing relay SR4 is closed through conductor 87 and stud #2 and the wiper of bank L3 of the rotary switch, through conductor 33, operated contacts 9 of relay SR, and conductors 16 and 94 to negative battery. The transfer relay circuits for storing relays SR1, SR2, SR3 and SR5 are open and a carriage return (4 marking: 1, 2, 3, 5 spacing) will be transferred by the transfer pulses from segments 7 to 11 of the distributor.

Relay XAS will be operated and locked by the next transmitter step pulse over conductor 22, and at its contacts 2 opens the counter reset circuit, and also auto-stops the tape transmitter so that the reading relays R1 to R5 are operated to their spacing contacts. Circuits for the count, operate, and reading functions, now being open, no changes will take place for these pulses. The next rotary switch step pulse will step the switch to stud #3 closing the transfer circuit for storing relay SR2 over conductors 86, switch bank L3, and conductors 33, 16 and 94 to negative battery, and a line feed will be transferred. The next switch step pulse will step the rotary switch to stud #4, closing the transfer circuit for storing relay SR3, over conductors 91, 13, switch bank L3, and conductors 33 and 16 to negative battery, and a space character is transferred. The transmitter step, count, operate, and read pulses for this and the following three revolutions of the distributor DR will effect no circuit changes. The switch step pulses, over conductors 25 and 82 and switch bank L1, accompanying each set of the above pulses will step the rotary switch to studs #5, #6 and #7, successively transferring a space for each revolution.

When the rotary switch reaches stud #7, a circuit over its switch bank L4 is closed from the operate segment 3 of the distributor, through conductors 21 and 83, and stud #7 and the wiper of L4 of the rotary switch, conductor 32, operated contacts 5 of relay SR, conductor 63, and the left-hand coil of relay RTG to ground. The next operate pulse will therefore operate and lock the restoring relay RTG, which at its operated contacts 3 prepares a circuit to knock down relay XAS and the next transmitter step pulse. The switch step pulse immediately following the above operate pulse will step the rotary switch RS to stud #8, and a fifth space will be transferred.

The next transmitter step pulse over conductor 22 will knock down the auto-stop relay XAS, allowing the tape transmitter to step to the next character in the tape. The count pulse will reset the counter 109 and will release the restoring relay RTG over a circuit comprising conductor 11, contacts 3 of relay COR, conductor 71, operated contacts 4 of relay SR, conductor 66, operated contacts 1 and 2, and the right-hand winding of relay RTG; from conductor 66 the count pulse also flows through unoperated contacts 2 of relay XAS and conductor 23, unoperated contacts 2 of relay HT, and conductor 26 to operate the reset magnet RES of the counter. The operate pulse over conductors 21 and 64 and operated contacts 1 and 2 and right-hand winding of relay SR cause the relay to release, restoring the circuits to normal. The rotary switch RS will continue to step for each switch step pulse from local segment 5 of the distributor until the switch is advanced to its home position on stud #1 of the adjacent set of contact studs, whereupon the switch stops until it is again required in the sequence of conversion operations.

*Comma*

The comma is an upper case tape printer character with the code selection 4 marking, and 1, 2, 3, 5 spacing. This must be converted to upper case "N" (comma) for page printer operation. Since this is an upper case character, relay UCR, Fig. 3, was operated and locked by the read pulse from local segment 4 of distributor DR over conductor 1 when the preceding figures shift character was set up on the reading relays R1 to R5 by the tape transmitter. When the comma is set up on the reading relays under this condition, relay PER, Fig 3, is operated by the next read pulse received over a circuit comprising conductor 1, operated contacts 2 of reading relays R1, R2 and R5, unoperated contacts 1 of relay R4, operated contacts 2 of relay R3, conductor 55, unoperated contacts 3 of relay PSR and the left-hand winding of relay PER to negative battery. Relay PER locks to negative battery through its right-hand winding and its operated contacts 1, resistance $r6$ and the left-hand winding of relay PSR to ground, causing PSR to operate and lock through its right-hand winding and operated contacts 1, although the operation of PSR is merely incidental to the conversion of the comma. The operated contacts 2 of relay PER set up its own knockdown circuit; operated contacts 3, 4, 6 and 7 of the relay are not involved in the comma translation. At its operated contacts 5 relays PER sets up the transfer circuit for storing relay SR3 through the contacts 5 of operated relay UCR. Since the transfer circuit for the 4th pulse set up on the reading relay R4 is not subject to the control of these relays, a comma will be transferred by the following transfer pulses from segments 7 to 11 of distributor DR.

The next transmitter step pulse over conductor 22 will step the transmitter to the next character in the tape. The next operate pulse over conductors 21 and 64 will restore relay PER since the positive current which flows through operated contacts 2 and the right-hand winding of the relay neutralizes the effect of the negative holding current through this winding. The release of relay PER opens at its contacts 1 the operating circuit for relay PSR. PSR will be immediately knocked down unless a "blank" or "period" is set up on the reading relays. The character which usually follows the comma is a letters shift, so that ordinarily relay PSR is knocked down, over a circuit from positive battery through contacts 1 of any of reading relays R1, R2, R3 and R5, conductor 54 and contacts 2 of PSR, in which case the circuits will all be back to their normal condition.

*Period*

A single "period," which is received as a lower case tape printer character having the code selection 4 marking, and 1, 2, 3, 5 spacing, must be converted to "figures shift," "M", "letters shift." As hereinafter set forth, if two periods were to be converted (end-of-message), the second period would be converted to a number of additional operations. Since the tape printer is in the lower case for the "period," relay UCR of Fig. 3 will be in its released position. When the period character is set up on the reading relays R1 to R5, relay PER will be operated and locked by the next read pulse through conductors 1 and 55, released contacts 3 of the period storing relay PSR, and left-hand winding of PER to negative battery. Operated contacts 2 of relay PER set up its own knockdown circuit; its operated contacts 1 close a circuit through its right-hand locking coil for operating the relay PSR; operated contacts 5 of PER operate relay UCT, Fig. 4, through the unoperated contacts 5 of relay UCR; operated contacts 3 of PER open the auto-stop circuit comprising conductor 51; operated contacts 4 of the relay open the counter circuit and transfer the count pulse to the release circuit 34 of the lower case transfer relay LCT; and operated contacts 6 of PER open the knockdown circuit for relay COR. The operating circuit for relay PSR is arranged so that the relay will not operate until the distributor brush B2 leaves the "read pulse" local segment 4 of distributor DR. This is effected by reason of the fact that while the brush B2 is still in contact with the local segment 4 and current is flowing through the left-hand winding of relay PER, the potential at the junction of resistance $r5$ and the windings of PER is substantially zero or ground because the voltage drop across the resistance, which is connected to negative battery, is approximately equal to the voltage drop across the circuits from the junction point, this circuit including the left-hand winding of relay PER and the resistance R3 of Fig. 2 which is connected to positive battery. When relay PER is operated, a circuit is established from negative battery through the resistance $r5$ and the right-hand winding and operated contacts 1 of PER and through a resistance $r6$ and the left-hand winding of relay PSR to ground. No appreciable current flows in this circuit until the distributor brush B2 has passed off local segment 4 because of the voltage drop in the resistance $r5$, but when the brush has left segment 4 current does flow through the right-hand or locking winding of PER and the left-hand or operating winding of relay PSR, which locks PER and operates PSR. This circuit arrangement prevents the operation of relay PSR during the "read" pulse from local segment 4 and the premature connection of the reading circuit of relays R1 to R5 to the double period relay DPR.

The contacts 3 of operated relay PSR open the operating circuit of relay PER so that it is then held operated only by its own locking circuit. The contacts 1 of operated relay UCT, Fig. 4, prepare circuits for its own knockdown and the operation of relay MT; and contacts 5, 4 and 3 of UCT respectively close the transfer relay circuits for storing relays SR1, SR2 and SR5. The transfer relay circuit for the 4th pulse is not subject to these relays and is closed by the 4th reading relay R4. A figures shift character will therefore be transferred by the following transfer pulses from segments 7 to 11 of the local ring of DR.

The next transmitter step pulse over conductor 22 operates and locks relay XAS, auto-stopping the tape transmitter. The operated contacts 3 of relay XAS open the knockdown circuit 64 for relay PER and complete the knockdown circuit for relay UCT. The count pulse over conductor 11 finds no closed circuit and no change takes place. The next operate pulse over conductors 21 and 30 knocks down relay UCT and operates and locks the M transfer relay MT. The contacts 6, 5 and 4 of relay MT respectively close the transfer relay circuits for storing relays SR3, SR4 and SR5. The transfer circuits for storing relays SR1 and SR2 are open at the reading relay contacts because of the auto-stopping of the transmitter. The read pulse over conductor 1 finds the read circuit open and effects no change. The character for the period will therefore be transferred by the following transfer pulse.

The next transmitter step and count pulses perform no function. The next operate pulse over conductors 21 and 30 knocks down relay MT, and operates and locks the lower case transfer relay LCT. The operated contacts 3 of relay LCT close the auto-stop circuit, and at its operated contacts 6 to 10 closes the transfer relay circuits for the storing relays R1 to R5. The letters shift character will therefore be transferred by the following transfer pulses from segments 7 to 11 of the distributor.

The next transmitter step pulse over conductor 22 will knock down relay XAS, releasing the transmitter and allowing the next character in the tape to be stepped over the transmitter pins. The next count pulse over conductors 11, 71 and 34 will knock down relay LCT. The operate pulse over conductors 21 and 64 will knockdown relay PER, restoring the counter, COR, and auto-stop circuits to normal. If the new character in the transmitter is other than a blank or a period, relay PSR will be knocked down by a circuit through the contacts of the reading relays R1 to R5.

*Double period*

When a double period (end-of-message) is received and the second period has been stepped over the transmitter pins, the relay PSR, Fig. 3, described above in connection with the single period will remain locked, and at its operated contacts 3 will open the reading circuit to prevent the operation of relay PER during the next read pulse from local segment 4 of distributor DR. The reading of the second period starts a series of events: First, a carriage return and line feed are transmitted; then a circuit is closed to request the time and date from time and date transmitter circuit, the call-controlled portion of which is shown on Fig. 5. When the time and date transmission has been completed by a special transmitter in the time and date mechanism, another carriage return and eight line feeds are transmitted by the distributor DR.

The read pulse over conductor 1 and through the contacts of the reading relays R1 to R5 for the second period operates the double period relay DPR over conductor 55 and the operated contacts 3 of relay PSR, and DPR locks to negative battery over its contacts 1. Operated contacts 2 of relay DPR set up its own knockdown circuit; operated break contacts 3 open the auto-stop circuit; operated break contacts 4 open the counter circuit; operated make contacts 4 set up a circuit for the counter reset magnet and also set up a circuit for knocking down relays LFT and RTG; operated contacts 6 set up a circuit for the operation of relays DPS and RTG; operated contacts 5 set up a circuit for the operation of relay CRT; operated contacts 7 break a portion of a circuit for shunting the tape lever contacts; operated contacts 8 set up a knockdown circuit for relays TDR and TDE; operated contacts 9 open the knockdown circuit of relay COR; and operated contacts 10 prepare a circuit for operating storing relay SR2 or SR4 when the rotary switch RS is stepped.

Relay CRT will be operated over conductor 2 through the released contacts 4 of the time and date request relay TDR, and at its operated contacts 2 relay CRT will connect negative battery to the transfer relay circuit 87 for storing relay SR4 (this connection will parallel a similar one through the R4 reading relay contacts 6 to the storing relay SR4), and a carriage return comprising 4 marking, 1, 2, 3, 5 spacing will be transferred by the transfer pulses from segments 7 to 11 of the local rings of distributor DR.

The next transmitter step pulse over conductor 22 will operate relay XAS to auto-stop the transmitter. The following count pulse applied to conductor 11 performs no function. The next operate pulse over conductors 21 and 30 knocks down relay CRT and operates and locks relay LFT to close the transfer circuit 36 for storing relay SR2, so that a line feed is transferred by the transfer pulses.

The next transmitter step pulse over conductors 22, 65, 39 and 28 operates the time and date request relay TDR through the contacts of relays LFT and DPR, and TDR locks over conductor 79 and contacts 8 of relay DPR to negative battery. The count pulse knocks down the relay LFT over a circuit comprising conductors 11, 71, 66, and 27, and the contacts of relays COR and DPR. The knockdown circuit for relay COR is completed through conductors 24 and 69 and the operated contacts 2 of relay TDR and the released contacts 2 of relay TDE, so that relay COR is released by the next pulse from segment 12 of the local rings of the distributor. The release of relay COR at its contacts 3 short-circuits, through conductors 9 and 10, the distributor sending rings; and at its released contacts 6 relay COR applies ground through the contacts 3 of relay TDR and conductor 165*a* to operate the associated request time relay A, Fig. 5, of the time and date control circuit. The associated cut-in relay B on the time and date control panel will then be operated and the time and date will be transmitted to the outgoing line L.

The time and date transmitter referred to above is disclosed in a pending application of W. S. W. Edgar, Jr., Serial No. 94,214, filed May 19, 1949, the disclosure of which is incorporated herein by reference, although the disclosure of the call-controlled relays A, B and C of Fig. 5 in the instant application is believed sufficient for the purpose of explaining the instant invention which does not involve details of the time and date transmitter per se. Briefly, such a time and date transmitter embodies a plurality of settable devices including rotary switches and relays upon which the variable information to be automatically transmitted is stored in the form of telegraph code signals. This information comprises the time of day in hours and minutes, the day of the month, the month and year, together with certain arbitrary and case shift signals. A typical time and date message would appear in the following printed form:

(1250 PM AUG 22 48)=

The time of day signals are changed each minute by "minute" pulses from any suitable source, such as from time signals supplied in the standard Western Union Telegraph Company time system or from contacts of an electrically driven clock. These same signals serve to change the meridian setting to indicate A. M. or P. M. At the end of each month, irrespective of the number of days, these time signals act through the storage devices to operate an alarm or indicator to indicate to an attendant the necessity for changing the "month" abbreviation storage, which is effected by means of a manual switch. The "year" is also set manually at the end of each year. In addition to the time and date storage mechanism the device includes a collator switch for assembling the data currently set up on the various time and date storage devices, and an associated distributor for operating the collator switch and applying the time and date signals to the outgoing line.

The control of the time and date distributor is accomplished by means including the control relays A, B and C of Fig. 5 of the instant application, which figure corresponds generally to the upper half of Fig. 6 of the aforesaid Edgar application, the relays being responsive to a call for the time and date transmission initiated by the usual double period end-of-message signal hereinbefore referred to. The time and date call-controlled mechanism shown in Fig. 5 herein is individual to a transmitter-distributor, such as the code converter which comprises the instant invention, but the remainder of the time and date transmitter is common to a plurality of transmitter-distributors. If, at the time a call is placed for time and date transmission over any circuit, transmission is proceeding over another circuit or circuits, or if the time and date storage mechanism is in the course of operation in response to a "minute" impulse, the transmission over the calling circuit will be delayed until either or both operations have been completed. On the other hand, should a time pulse be received during a transmitting operation, the setting up of the new time on the time storage mechanism will be delayed until the transmission is completed.

Referring again to Figs. 2 and 5 herein, constant negative battery *b1* of Fig. 2 is applied, through conductor 9 and the closed contacts 3 of relay COR, to conductor 10 whenever the time and date transmitter is to become effective, the circuit, Fig. 5, including make-before-break contacts 128 of relay B, a resistance 127, and conductor 129 to the outgoing line L. Relay A is associated with an "on home" multiple 143 connected to the inner make contact of the A relays of all transmitters having access to the time and date transmitter. Relays B are similarly associated with a "start time" multiple 144 connected to the make contacts 145 of all B relays. Relays C have right-hand windings connected to a "time sent" multiple 146, and the grids of transmitting vacuum tubes 142 are connected to a "time and date transmitting" multiple 147.

Relay A upon operating, over conductor 165*a*, due to the operation of relay TDR hereinbefore described, operates relay B over a circuit from positive battery through the right-hand winding of the latter relay, inner armature and back contact of relay C, and inner armature and make contact of relay A to the multiple 143. Should the collator switch of the time and date transmitter be off its home position at the time relay A is operated, the operation of relay B awaits its return to such position. Once operated, relay B locks up from battery on the middle armature of relay C, its break contact, inner armature and make contact of relay B and its left-hand winding to ground. Relay B at its operated make-before-break contacts 128 connects the vacuum tube 142 in series with conductors 10 and 129 and hence with the outgoing line L, and removes the resistance 127. At its make contact 145 relay B connects ground to the "time start" multiple 144, and at its armature 151 and make contact it connects battery to the right-hand winding of the associated cut-out relay C and thence to multiple 146 for the subsequent operation of relay C as hereinafter set forth.

The grounding of multiple 144 causes operation of the time and date transmitter circuit from a time and date transmitting distributor which transmits two characters per revolution. The first character to be transmitted will be the figures shift code which is set up on the time and date transmitter segments and transmitted to the grids of all vacuum tubes 142 associated with the multiple 147. The marking elements of each code signal cause negative potential on the grid of tube 142 to be reduced, thereby permitting a marking pulse to flow over conductor 10, operated contacts 128 of relay B, through the tube and conductor 129 to the outgoing line L. Spacing code elements are represented by no-current conditions since the vacuum tube 142 is blocked to prevent the passage of current at such time.

When transmission of the time and date has been completed, the associated cut-out relay C will be operated over multiple 146, and is locked from battery on its middle armature and make contact, its left-hand winding and the outer armature and make contact of relay A. Relay C at its inner armature opens the operating circuit for relay B to the multiple 143, and at its middle armature it opens the locking circuit for relay B. Relay B then releases and the time and date transmitting tube 142 is removed from the outgoing line circuit and the resistance 127 again inserted in the circuit. The outer operated contacts of relay C apply ground to the "release call" connection 165 and operate the time and date end relay TDE of Fig. 1, which relay locks over conductor 79 and contacts 8 of relay DPT. The operation of relay TDE at its contacts 2 opens the knockdown circuit for relay COR, and at its contacts 3 closes the stepping circuit for the rotary switch RS of Fig. 4, this circuit comprising segment 5 of the local rings of distributor DR, conductors 25, 77, 78, 36 and magnet SM2. This operation is fortuitous with respect to the position of the brush B2 of the distributor and may occur either just before the brush passes over the switch step segment 5 of the local rings or just after it has passed off this segment.

In the first case, the rotary switch RS of Fig. 4 will be stepped to stud #2, and through its bank L2 closes the transfer relay circuit comprising conductor 87 for storing relay SR4, allowing a carriage return to be transferred. The COR pulse from segment 12 of distributor DR immediately following will operate relay COR over conductors 24 and 69; relay COR locks and at its operated contacts 3 removes the short-circuit connection between the sending rings of distributor DR and allows the carriage return to be transmitted on the following revolution of the distributor brushes. In the second case, if relay DTE, Fig. 1, is operated from the time and date transmitter circuit just after the distributor brushes pass off the switch step segment 5, relay COR will be operated and locked when the next COR pulse is received over conductor 24, removing at its operated contacts 3 the connection between the sending rings. Since no storing relays are energized, a blank will be transferred and later transmitted while the rotary switch RS is stepped to stud #2 by the next switch step pulse from segment 5 of the distributor DR. The transfer circuit comprising conductor 87 for storing relay SR4 will then be closed to permit the transfer and subsequent transmission of the carriage return.

The switch step pulse from segment 5 occurring during the transmission of the carriage return will step the rotary switch RS to stud #3, closing the transfer circuit comprising conductor 86 for storing relay SR2, allowing a line feed to be transferred. This operation will be repeated as the rotary switch steps to studs #4, #5, #6, #7, #8 and #9, successively. The double period storing relay DPS and the restoring relay RTG will be operated, over conductors 21, 83 and 31, by the operate pulse from segment 3 on the revolution of distributor DR following the stepping of the rotary switch to stud #9 of switch bank L4 and the transfer of the seventh line feed. Both of these relays will lock in their operated condition. The rotary switch is then stepped to stud #10 and the eighth line feed is transferred.

The next transmitter step pulse from segment 1 of the distributor, over conductor 22 and contacts 3 of relay RTG, releases relay XAS. The count pulse over conductors 11, 71, 66, 23 and 26 resets the counter 100, and over conductors 11, 71 and 66 releases relay RTG. The operate pulse from segment 3 of distributor DR releases relay DPR to remove the lock from redays TDR and TDE which release. Relay A of Fig. 5 thereupon releases and unlocks relay C and both relays are restored to normal. The rotary switch RS of Fig. 4 continues to step until it reaches the home position (stud #1). If a blank is stepped into the tape transmitter by the release of the auto-stop relay XAS, the next COR pulse over conductors 24, 69, 70, and contacts of operated relays R1 to R5 will release relay COR which in turn will release relay DPS, thereby completing the translator functions.

It is to be understood that the code translator disclosed herein may be embodied in suitable cord or jack circuits so that the translator may be connected to and disconnected from selected incoming and outgoing line circuits as the necessity for the translator may arise, and that a translator may be common to a plurality of telegraph circuits with which it may be used successively at different times as traffic conditions require.

It will be obvious to those versed in the art that the specific embodiment of the invention disclosed herein may take various other forms without departing from the spirit and principle of the invention. The present embodiment is therefore illustrative and not restrictive, and the invention is not limited except as indicated by the scope of the appended claims.

What is claimed is:

1. In a telegraph system having a transmitter controlled by tape printer code signals, a transmitting distributor and a receiving mechanism controlled by page printer code signals and in which the tape printer code differs in certain characters from the page printer code, means for translating said certain tape printer characters into page printer characters comprising, in combination, a group of reading relays responsive to the tape printer code signals from said transmitter and selectively settable in accordance with the codal units of the tape printer characters, a group of storing relays selectively settable for marking the code transmitting contacts of said distributor, means including transfer contacts on said distributor for transferring successively to said storing relays the codal units of the character set up on the reading relays when tape to page translation is not required, a plurality of translator relays selectively operable when said tape printer characters which require translation are set up on the reading relays. transfer relays controlled by the translator relays, means including other contacts of said distributor for timing the operation of said translator and transfer relays, and means including said transfer relays and said distributor transfer contacts for controlling the settings of said storing relays to effect translation to page printer characters.

2. In a telegraph system having a transmitter controlled by tape printer code signals, a cyclically operative transmitting distributor and a receiving mechanism controlled by page printer code signals and in which the tape printer code differs in certain characters from the page printer code, means for translating said certain tape printer characters into page printer characters comprising, in combination, a group of reading relays responsive to the tape printer code signals from said transmitter and selectively settable in accordance with the codal units of the tape printer characters, a group of storing relays selectively settable for marking the code transmitting contacts of said distributor, means including transfer contacts on said distributor for transferring successively to said storing relays the codal units of the character set up on the reading relays when tape to page translation is not required, a plurality of translator relays selectively operable when said tape printer characters which require translation are set up on the reading relays, transfer relays controlled by the translator relays, means including other contacts of said distributor for timing the operation of said translator and transfer relays, and means including said transfer relays and said distributor transfer contacts for controlling the settings of said storing relays to effect translation to page printer characters, said transfer contacts being operative in the cycle of operation of the distributor in which a previous character is sent by said transmitting contacts.

3. In a telegraph system having a transmitter controlled by tape printer code signals, a cyclically operative transmitting distributor and a receiving mechanism controlled by page printer code signals and in which the tape printer code differs in certain characters from the page printer code, means for translating said certain tape printer characters into one or more page printer characters comprising, in combination, a group of reading relays responsive to the tape printer code signals from said transmitter and selectively settable in accordance with the codal units of the tape printer characters, a group of storing relays selectively settable for marking the code transmitting contacts of said distributor, means including transfer contacts on said distributor for transferring successively to said storing relays the codal units of the character set up on the reading relays when tape to page translation is not required, a plurality of translator relays selectively operable when said tape printer characters which require translation are set up on the reading relays, transfer relays controlled by the translator relays, means including other contacts of said distributor for timing the operation of said translator and transfer relays, and means including said transfer relays and said distributor transfer contacts for controlling the settings of said storing relays to effect translation to page printer characters and for successively setting up on the storing relays a plurality of page printer characters when effecting each of predetermined ones of said translations.

4. Translator apparatus according to claim 3, having at least one translator relay that is selectively operable when the tape printer character set up on the reading relays is an arbitrary sign which does not appear in the page printer code, and means operable in response to the operation of said translator relay for causing a plurality of predetermined page printer characters to be set up successively on the storing relays and transmitted by the distributor in lieu of said arbitrary sign.

5. Translator apparatus according to claim 3, having at least one translator relay that is selectively operable when the tape printer character set up on the reading relays is an arbitrary sign which does not appear in the page printer code, and means including a plurality of transfer relays operable in response to the operation of said translator relay for causing a plurality of predetermined page printer letter characters to be set up successively on the storing relays and transmitted by the distributor in lieu of said arbitrary sign.

6. Translator apparatus according to claim 3, having a translator relay that is operable when a tape printer paragraph sign is set up on the reading relays, and means operable in response to the operation of said translator relay for causing a carriage return, a line feed and a plurality of letters space characters to be set up successively on the storing relays and transmitted by the distributor in lieu of said paragraph sign.

7. Translator apparatus according to claim 3, including means comprising circuit connections controlled by contacts on said transmitting distributor for stopping the first named transmitter for a time sufficient to enable said plurality of page printer characters successively set up on the storing relays to be transmitted by the distributor and to set up on said storing relays a succeeding character during the cycle of operation of the distributor in which the last of said plurality of page printer characters is transmitted.

8. In a telegraph system having a transmitter controlled by tape printer code signals, a cyclically operative transmitting distributor and a receiving mechanism controlled by page printer code signals and in which the tape printer code differs in certain characters from the page printer code, means for translating said certain tape printer characters into page printer characters comprising, in combination, a group of reading relays responsive to the tape printer code signals from said transmitter and selectively settable in accordance with the codal units of the tape printer characters, a group of storing relays selectively settable for marking the code transmitting contacts of said distributor, means including transfer contacts on said distributor for transferring successively to said storing relays the codal units of the character set up on the reading relays when tape to page translation is not required, a plurality of translator and transfer relays selectively operable when said tape printer characters which require translation are set up on the reading relays, means including other contacts of said distributor for timing the operation of said translator and transfer relays, connections including said transfer relays and said distributor transfer contacts for controlling the settings of said storing relays to effect translation to page printer characters, means for counting the number of characters in a line of page printer copy being transmitted by the distributor, means controlled by said counter and operative when a predetermined number of characters have been transmitted for conditioning a circuit for the subsequent operation of a particular one of said translator relays, means for operating said translator relay when the next "space" character is set up on the reading relays, and means responsive to the operation of the translator relay for controlling certain of said transfer relays and the storing relays to cause the distributor to transmit page printer carriage return and line feed characters in lieu of said "space" character.

9. Translator apparatus according to claim 8, in which said means for counting the number of characters is an electromagnetic counter actuated from a starting position by stepping pulses from contacts on the transmitting distributor, contacts on said counter operative when a predetermined number of characters have been counted for partially preparing a circuit for the subsequent operation of a particular translator relay, means for operating the translator relay when the next "space" character is set up on the reading relays, means responsive to the operation of the translator relay for causing carriage return and line feed transfer relays successively to control the storing relays and cause the distributor to send page printer carriage return and line feed characters, and means including circuit connections controlled by contacts on the distributor for resetting said counter to a starting position.

10. In a telegraph system having a transmitter controlled by tape printer code message signals, a cyclically operative transmitting distributor for sending to an outgoing line and a receiving mechanism controlled by page printer code signals sent over the line and in which the tape printer code differs in certain characters from the page printer code, means for translating said certain tape printer characters of the message into page printer characters comprising, in combination, a group of reading relays responsive to the tape printer code signals from said transmitter and selectively settable in accordance with the codal units of the tape printer characters, a group of storing relays selectively settable for marking the code transmitting contacts of said distributor, means including transfer contacts on said distributor for transferring successively to said storing relays the codal units of the character set up on the reading relays when tape to page translation is not required, a plurality of translator relays selectively operable when said tape printer characters which require translation are set up on the reading relays, means responsive to the operation of said translator relays for controlling the settings of said storing relays to effect translation to page printer characters, means for connecting an auxiliary transmitter to said outgoing line to transmit additional information pertinent to the message transmitted by said distributor and for disconnecting the auxiliary transmitter from the line when the additional information has been transmitted, means including a translator relay operative when an end-of-message signal has been set up on the reading relays for actuating said connecting means, and means operative when the transmission of the additional information has been completed for causing a carriage return and a plurality of line feed characters to be set up successively on the storing relays and transmitted by said distributor.

11. Translator apparatus according to claim 10, comprising a relay and circuit connections controlled thereby for shunting out the transmitting contacts of said distributor during the time that said auxiliary transmitter is transmitting.

12. Translator apparatus according to claim 10, comprising means including a translator relay operative when an end-of-message signal has been set up on the reading relays for causing carriage return and line feed characters to be set up successively on the storing relays and transmitted by said distributor, and a request relay for operating said means for connecting the auxiliary transmitter to the outgoing line following the transmission of said carriage return and line feed characters.

13. Translator apparatus according to claim 10, including means for causing carriage return and line feed characters to be transmitted by said distributor prior to the operation of the auxiliary transmitter and means for causing a plurality of line feed characters to be transmitted by the distributor upon completion of the operation of the auxiliary transmitter.

14. Translator apparatus according to claim 10, in which the auxiliary transmitter sends the time and date of the message transmitted by the said distributor and is connected to the outgoing line in response to the operation of a time-and-date request relay, and means controlled by the translator relay for actuating the said request relay.

15. Translator apparatus according to claim 10, in which the said means including a translator relay is operative when the second of two successive "period" characters has been set up on the reading relays, and means for preventing false operation thereof when only one "period" character has been set up on the reading relays.

ALBERT E. FROST.

REFERENCES CITED

The following references are of record in the file of this patent:

UNITED STATES PATENTS

| Number | Name | Date |
| --- | --- | --- |
| 1,943,654 | Collins | Jan. 16, 1934 |
| 2,162,170 | Hicks et al. | Jan. 13, 1939 |
| 2,379,865 | Connery et al. | July 10, 1945 |